(12) United States Patent
Ogawa et al.

(10) Patent No.: US 7,690,477 B2
(45) Date of Patent: Apr. 6, 2010

(54) VEHICULAR STEERING SYSTEM

(75) Inventors: Kenji Ogawa, Tokyo (JP); Takayuki Kifuku, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 491 days.

(21) Appl. No.: 11/698,961

(22) Filed: Jan. 29, 2007

(65) Prior Publication Data
US 2008/0097670 A1   Apr. 24, 2008

(30) Foreign Application Priority Data
Sep. 14, 2006   (JP)   ............................... 2006-249594

(51) Int. Cl.
*B62D 6/00* (2006.01)
(52) U.S. Cl. .................. 180/446; 180/443; 701/41
(58) Field of Classification Search ................. 180/446, 180/443; 701/41, 42
See application file for complete search history.

(56) References Cited
FOREIGN PATENT DOCUMENTS

| | | | |
|---|---|---|---|
| DE | 10 2004 048 495 | * | 11/2003 |
| DE | 10-2004-048-495 A1 | | 5/2005 |
| JP | 2000-344121 A | | 12/2000 |
| JP | 2000-351383 A | | 12/2000 |
| JP | 3489112 B2 | | 11/2003 |
| JP | 3518590 B2 | | 2/2004 |
| JP | 2005-008033 A | | 1/2005 |
| JP | 2006-096187 A | | 4/2006 |

* cited by examiner

*Primary Examiner*—Lesley Morris
*Assistant Examiner*—Michael R Stabley
(74) *Attorney, Agent, or Firm*—Sughrue Mion, PLLC (57) ABSTRACT

A vehicular steering system can suppress, even upon a change in a neutral position of a steering wheel, a right and left difference in the behavior of a vehicle by keeping neutral positions of steerable road wheels from the start of control. The system includes a steering mechanism that steers the steerable road wheels of the vehicle through the steering wheel and an auxiliary steering angle superposition mechanism. A steered angle of the steerable road wheels is detected as an absolute angle. The auxiliary steering angle superposition mechanism is controlled by a target auxiliary steering angle. An activation angle setting section sets, at the start of control, the initial values of a steering wheel angle and an auxiliary steering angle as an activation steering wheel angle and an activation auxiliary steering angle by the steered angle and a transmission characteristic between the steering wheel angle and the steered angle.

4 Claims, 7 Drawing Sheets

VEHICULAR STEERING SYSTEM

BACKGROUND OF THE INVENTION

1. Field of the Invention

The present invention relates to a vehicular steering system having a steering mechanism for steering the steerable road wheels of a vehicle in accordance with a value that is obtained by mechanically adding the steering wheel angle of a steering wheel installed on the vehicle and an auxiliary steering angle due to an electrically controlled auxiliary steering angle superposition mechanism to each other. In particular, the invention relates to such a system that performs steering (intervention steering) to correct the steering operation of the steering wheel by a driver, and at the same time changes a transmission characteristic between the steering angle of the steering wheel operated by the driver and the steered angle of the steerable road wheels.

2. Description of the Related Art

Conventionally, there has been known a vehicular steering system in which an auxiliary steering angle superposition mechanism and a steering mechanism are interposed between a steering wheel and steerable road wheels of a vehicle, so that the steerable road wheels are steered by superposing an amount of auxiliary steering by an electric motor in the auxiliary steering angle superposition mechanism on an amount of steering of the steering wheel operated by a driver. A planetary gear mechanism, a differential gear mechanism or the like is used as the auxiliary steering angle superposition mechanism. Such a vehicular steering system changes a transmission characteristic of the steering angle of the steering wheel to the steered angle of the steerable road wheels in accordance with the traveling condition of a vehicle.

For example, a conventional vehicular steering control apparatus as described in a first patent document (Japanese patent No. 3518590) is provided with a transmission ratio variable mechanism that changes a transmission ratio (transmission characteristic) between the steering angle of the steering wheel (steering wheel angle) and the steered angle of steered road wheels (steerable road wheels). In addition, the conventional vehicular steering control apparatus is also provided with a steering angle detection section that detects the steering angle of the steering wheel as a relative angle, a driving section that drives the transmission ratio variable mechanism to rotate, an operation angle detection section that detects the operation angle of the driving section (auxiliary steering angle) as an absolute angle, and a control section that drives and controls the driving section based on the transmission ratio set in accordance with the traveling state of the vehicle and the steering angle detected by the steering angle detection section. The control section is provided with an estimation section that estimates an absolute steering angle of the steering wheel based on the detection result of the operation angle detection section and the transmission ratio set in the transmission ratio variable mechanism (see, for example, the first patent document).

Further, another conventional vehicular steering control apparatus as described in a second patent document (Japanese patent No. 3489112) is provided with a transmission ratio variable mechanism that can change a transmission ratio (transmission characteristic) between the steering angle of a steering wheel (steering wheel angle) and the steered angle of steered road wheels (steerable road wheels). Also, this conventional vehicular steering control apparatus is provided with an actuator for driving the transmission ratio variable mechanism and a control section for controlling the operation of the actuator. The control section is provided with a control amount setting section that temporarily sets a target steered angle value in the form of a target value of the steered angle and at the same time sets a main control amount for the actuator, a first correction section that sets, upon occurrence of a phase deviation in which a neutral position of the steering wheel and a neutral position of the steered road wheels are different from each other, a first correction amount to correct the temporarily set target steered angle value so as to leave the phase deviation, and a second correction section that sets a second correction amount to decrease the first correction amount so as to reduce the phase deviation. The control amount setting section calculates the target steered angle value in the form of the target value of the steered angle based on a deviation between the temporarily set target steered angle value and the first correction amount decreased by the second correction section, and sets the main control amount for the actuator based on a deviation between the calculated target steered angle value and the steered angle of the steered road wheels (see, for example, the second patent document).

In the conventional apparatus of the above-mentioned first patent document, the transmission characteristic of the steering wheel angle to the steered angle of the steerable road wheels is set based on the traveling condition of the vehicle including the vehicle speed, the steering speed of the steering wheel, etc., and the target steered angle is calculated based on the steering wheel angle and the transmission characteristic. In addition, a target auxiliary steering angle is calculated based on a characteristic that is decided from the target steered angle and the mechanical construction of the auxiliary steering angle superposition mechanism.

A rotary encoder or the like is used as a sensor for detecting the steering wheel angle or the steered angle, as shown in the above-mentioned first patent document. The rotary encoder calculates an angle by outputting two-phase pulse signals comprising a combination of "0" and "1", and counting these pulse signals, and hence, can not detect an absolute angle upon activation thereof. Accordingly, the conventional apparatus of the above-mentioned first patent document starts control by estimating the steering wheel angle and the absolute angle of the steered angle upon activation thereof based on the auxiliary steering angle, which is detected as an absolute angle, stored in memory and does not change during the time when the apparatus is stopped, and the transmission characteristic.

Here, note that when the steering wheel is steered while the apparatus is stopped, the steering wheel angle estimated from the auxiliary steering angle and the transmission characteristic is different from the actual steering wheel angle and hence becomes an incorrect value. In addition, the steered angle calculated based on the incorrectly estimated steering wheel angle becomes an incorrect value, as a result of which the neutral position of the steering wheel and the neutral positions of the steered road wheels are set to positions different from their actual neutral positions, respectively.

At this time, the auxiliary steering angle to be superposed by the auxiliary steering angle superposition mechanism is set based on the incorrectly estimated steering wheel angle, and the auxiliary steering angle superposition mechanism is driven to operate in accordance with the auxiliary steering angle thus incorrectly set. As a consequence, in case where the transmission characteristic includes a nonlinear characteristic, a right and left difference is generated in the steered angle characteristic of the steerable road wheels. Here, the meaning that the transmission characteristic indicates a nonlinear characteristic is that the ratio of the change of the steered angle with respect to the change of the steering wheel angle in the vicinity of the neutral positions of the steerable road wheels and the ratio of the change of the steered angle with respect to the change of the steering wheel angle at a location away from the neutral positions of the steerable road wheels are different from each other.

Accordingly, an uncomfortable feeling due to the deviation of the neutral position of the steering wheel or an uncomfortable feeling due to the right and left difference of the vehicle behavior would be caused to the driver of the vehicle, thus giving rise to a problem that there occurs a mismatch or discrepancy between driver's steering feeling and the actual vehicle behavior.

In order to solve such a problem, the conventional apparatus of the above-mentioned first patent document detects the speeds of the right and left steerable wheels, respectively, during travel of the vehicle, and estimates the steered angle based on the detected road wheel speeds. In addition, the steering wheel angle and the steered angle are corrected based on a deviation between the estimated steered angle and the detected steered angle.

Moreover, when the neutral position of the steering wheel and the neutral positions of the steerable road wheels are different from each other, i.e., when the target steered angle value, which is calculated based on the steering wheel angle and the transmission characteristic, and the detected steered angle are different from each other, the conventional apparatus of the above-mentioned second patent document corrects the target steered angle value by using a correction amount corresponding to a deviation between the target steered angle value and the detected steered angle.

Further, by changing this correction amount toward "0", abrupt steering of the steerable road wheels is suppressed, and the neutral position of the steering wheel and the neutral positions of the steerable road wheels are made to coincide with each other.

In the vehicular control apparatus described in the above-mentioned first patent document, the steering wheel angle and the steered angle are corrected based on the deviation between the estimated steered angle and the detected steered angle, but there is a problem that the right and left difference of the vehicle behavior continues until the above-mentioned correction is finished.

Also, the vehicular control apparatus described in the above-mentioned second patent document, the target steered angle value is corrected by using a correction amount corresponding to a deviation between the target steered angle value and the detected steered angle. However, in case where the target steered angle value is corrected, the steerable road wheels are deviated an angle corresponding to a correction amount from their neutral positions, so there is a problem that a right and left difference in the vehicle behavior occurs.

SUMMARY OF THE INVENTION

Accordingly, the present invention is intended to obviate the problems as referred to above, and has for its object to provide a vehicular steering system in which even when a steering wheel is steered to change its neutral position during the system is stopped for example, a right and left difference in the vehicle behavior can be suppressed by keeping the neutral positions of the steerable road wheels from the start of control of the system.

Bearing the above object in mind, a vehicular steering system according to the present invention has a steering mechanism which includes a steering wheel installed on a vehicle and an electrically controlled auxiliary steering angle superposition mechanism for steering steerable road wheels of the vehicle. The vehicular steering system includes: a steering wheel angle detection section that detects a steering angle of the steering wheel as a steering wheel angle; an auxiliary steering angle detection section that detects an auxiliary steering angle to be superposed by the auxiliary steering angle superposition mechanism; a steered angle detection section that detects a steered angle of the steerable road wheels as an absolute angle; a travel state detection section that detects the traveling state of the vehicle; a transmission characteristic setting section that sets a transmission characteristic between the steering wheel angle and the steered angle in accordance with the traveling state of the vehicle; a target auxiliary steering angle calculation section that calculates a target auxiliary steering angle to be superpose by the auxiliary steering angle superposition mechanism based on the steering wheel angle and the transmission characteristic; a driving control section that controls driving of the auxiliary steering angle superposition mechanism so as to make the auxiliary steering angle coincide with the target auxiliary steering angle; and an activation angle setting section that sets an initial value of the steering wheel angle detected by the steering wheel angle detection section as an activation steering wheel angle based on the steered angle and the transmission characteristic, and also sets an initial value of the auxiliary steering angle detected by the auxiliary steering angle detection section as an activation auxiliary steering angle at the start of control of the auxiliary steering angle superposition mechanism.

According to the vehicular steering system of the present invention, at the start of control of the auxiliary steering angle superposition mechanism, the activation angle setting section sets an initial value of the steering wheel angle as an activation steering wheel angle based on the steered angle of the steerable road wheels detected as an absolute angle and the transmission characteristic set in accordance with the traveling condition of the vehicle, and also sets an initial value of the auxiliary steering angle as an activation auxiliary steering angle.

Accordingly, even when the steering wheel is steered to change its neutral position with the system being stopped for example, a right and left difference in the vehicle behavior can be suppressed by keeping the neutral positions of the steerable road wheels from the start of control.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Now, preferred embodiments of the present invention will be described in detail while referring to the accompanying drawings. Throughout respective figures, the same or corresponding members or parts are identified by the same reference numerals and characters.

Embodiment 1

Figure 1:
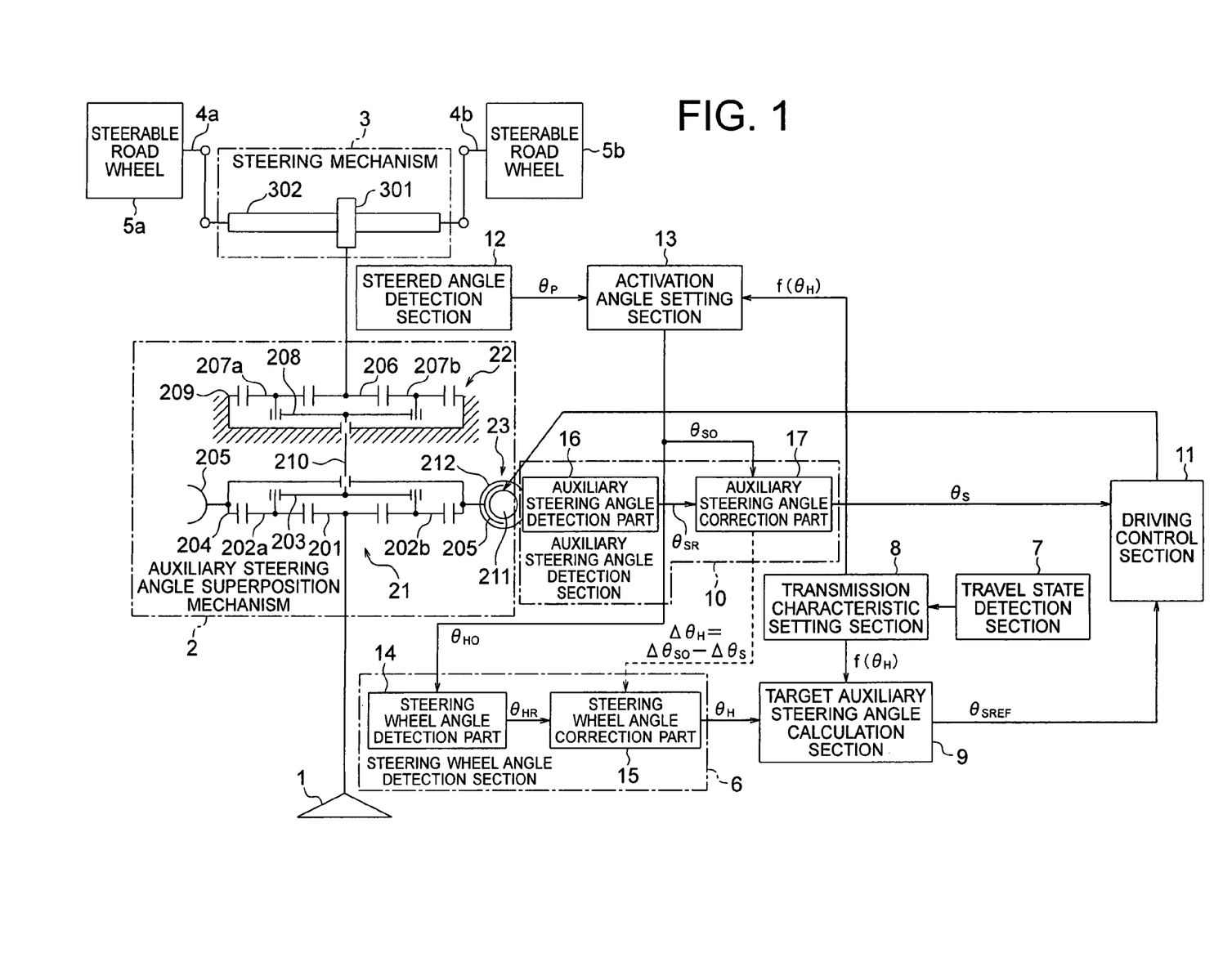
FIG. 1 is a block diagram showing a vehicular steering system according to a first embodiment of the present invention.

Referring to the drawings and first to FIG. 1, there is shown a block diagram of a vehicular steering system according to a first embodiment of the present invention.

In FIG. 1, the vehicular steering system is provided with a steering wheel 1 installed on a vehicle, an auxiliary steering angle superposition mechanism 2 that includes two planetary gear mechanisms 21, 22 and is electrically controlled, a pair of steerable road wheels 5a, 5b of a vehicle, a steering mechanism 3 that steers the steerable road wheels 5a, 5b of the vehicle through the steering wheel 1 and the auxiliary steering angle superposition mechanism 2, and a pair of knuckle arms 4a, 4b that connect between the steering mechanism 3 and the steerable road wheels 5a, 5b, respectively.

In addition, the vehicular steering system is further provided with a steering wheel angle detection section 6, a travel state detection section 7, a transmission characteristic setting section 8, a target auxiliary steering angle calculation section 9, an auxiliary steering angle detection section 10, a driving control section 11, a steered angle detection section 12, and an activation angle setting section 13, which will be described below in detail. The steering wheel angle detection section 6 includes a steering wheel angle detection part 14 and a steering wheel angle correction part 15. Also, the auxiliary steering angle detection section 10 includes an auxiliary steering angle detection part 16 and an auxiliary steering angle correction part 17. Here, note that the transmission characteristic setting section 8, the target auxiliary steering angle calculation section 9, the driving control section 11, the activation angle setting section 13, the steering wheel angle correction part 15, and the auxiliary steering angle correction part 17 are constituted by a microprocessor (not shown) that has a storage section with programs stored therein and a CPU.

The auxiliary steering angle superposition mechanism 2 is composed of a first planetary gear mechanism 21 that is connected with the steering wheel 1, a second planetary gear mechanism 22 that is arranged between the first planetary gear mechanism 21 and the steering mechanism 3, and a drive part 23 that is driven and controlled by the driving control section 11. The first planetary gear mechanism 21 has a sun gear 201 that is connected with the steering wheel 1, planetary gears 202a, 202b that are rotatably supported on a carrier 203 connected with one end of a shaft 210, and a ring gear 204 that is supported on the shaft 210 for rotation therearound and is provided with a worm wheel 205.

The second planetary gear mechanism 22 has a sun gear 206 that is connected with the steering mechanism 3, planetary gears 207a, 207b that are rotatably supported on a carrier 208 connected with the other end of the shaft 210 (the one end thereof being connected with the carrier 203), and a ring gear 209 that is fixedly secured to a case (not shown) of the auxiliary steering angle superposition mechanism 2. The drive part 23 has a worm gear 211 that is in mesh with the worm wheel 205 to rotate the ring gear 204, and an electric motor 212 for rotating the worm gears 211.

The steering mechanism 3 is of a rack-and-pinion type, and is composed of a pinion gear 301 that is connected with the sun gear 206, and a rack gear 302 that is in mesh with the pinion gear 301. The rotation of the pinion gear 301 is converted into a linear motion of the rack gear 302, and the linear motion of the rack gear 302 is converted into a steered angle $\theta_P$ of the steerable road wheels 5a, 5b through the knuckle arms 4a, 4b.

The steering wheel angle detection section 6 detects the steering angle of the steering wheel 1 as a steering wheel angle $\theta_H$. The travel state detection section 7 detects the traveling condition of the vehicle (e.g., the vehicle speed or the steering speed of the steering wheel). The transmission characteristic setting section 8 sets a transmission characteristic $f(\theta_H)$ between the steering wheel angle $\theta_H$ and the steered angle $\theta_P$ of the steerable road wheels 5a, 5b in accordance with the traveling condition of the vehicle. The transmission characteristic setting section 8 according to this embodiment stores, as a map, the transmission characteristic including a plurality of nonlinear characteristics selected in accordance with the vehicle speed.

The target auxiliary steering angle calculation section 9 calculates a target auxiliary steering angle $\theta_{SREF}$ to be superposed by the auxiliary steering angle superposition mechanism 2 based on the steering wheel angle $\theta_H$ detected by the steering wheel angle detection section 6 and the transmission characteristic $f(\theta_H)$ set by the transmission characteristic setting section 8. The auxiliary steering angle detection section 10 detects an auxiliary steering angle $\theta_S$ to be superposed by the auxiliary steering angle superposition mechanism 2.

The driving control section 11 controls the driving of the electric motor 212 in the auxiliary steering angle superposition mechanism 2 in such a manner that the auxiliary steering angle $\theta_S$ coincides with the target auxiliary steering angle $\theta_{SREF}$. The steered angle detection section 12 detects the steered angle $\theta_P$ of the steerable road wheels 5a, 5b as an absolute angle. At this time, the rotation angle of the pinion gear 301 corresponds, one to one, to the steered angle $\theta_P$ of the steerable road wheels 5a, 5b, so the steered angle detection section 12 according to this embodiment detects the rotation angle of the pinion gear 301 as an absolute angle, and detects this rotation angle as the steered angle $\theta_P$ of the steerable road wheels 5a, 5b.

Upon actuation of the vehicular steering system, i.e., at the start of control of the auxiliary steering angle superposition mechanism 2, the activation angle setting section 13 sets the initial value of the steering wheel angle $\theta_H$ detected by the steering wheel angle detection section 6 as an activation steering wheel angle $\theta_{H0}$ based on the steered angle $\theta_P$ at the time of activation (activation steered angle $\theta_{P0}$) detected by the steered angle detection section 12 and the transmission characteristic $f(\theta_H)$ set by the transmission characteristic setting section 8. Also, the activation angle setting section 13 sets the initial value of the auxiliary steering angle $\theta_S$ detected by the auxiliary steering angle detection section 10 as an activation auxiliary steering angle $\theta_{S0}$ based on the activation steering wheel angle $\theta_{H0}$ and the transmission characteristic $f(\theta_H)$.

Here, note that the vehicle is stopped upon activation of the apparatus, and hence a transmission characteristic corresponding to a vehicle speed of "0" is set in the transmission characteristic setting section 8. The activation steering wheel angle $\theta_{H0}$ set by the activation angle setting section 13 is input to the steering wheel angle detection part 14, and the activation auxiliary steering angle $\theta_{S0}$ is input to the auxiliary steering angle correction part 17.

The steering wheel angle detection part 14 detects the steering angle of the steering wheel 1 with respect to the activation steering wheel angle $\theta_{H0}$ as a steering wheel angle detection value $\theta_{HS}$ in the form of a relative angle. The steering wheel angle correction part 15 adds the steering wheel angle correction amount $\Delta\theta_H$ to the steering wheel angle detection value $\theta_{HS}$ detected by the steering wheel angle detection part 14, and outputs a steering wheel angle $\theta_H$ thus obtained. The steering wheel angle correction part 15 sets the initial value of the steering wheel angle correction amount $\Delta\theta_H$ (activation steering wheel angle correction amount $\Delta\theta_{H0}$) to "0" at the start of control of the auxiliary steering angle superposition mechanism 2, and sets, after the start of the control, the steering wheel angle correction amount $\Delta\theta_H$ so that the steering wheel angle $\theta_H$, the auxiliary steering angle $\theta_S$, and the steered angle $\theta_P$ can satisfy the mechanical property of the auxiliary steering angle superposition mechanism 2.

The auxiliary steering angle detection part 16 detects a rotation angle $\theta_M$ of the worm gear 211 as an absolute angle, and divides this rotation angle $\theta_M$ by a speed ratio $G_S$ from the worm gear 211 to the pinion gear 301 thereby to obtain an auxiliary steering angle detection value $\theta_{SR}$. The auxiliary steering angle correction part 17 adds the auxiliary steering angle correction amount $\Delta\theta_S$ to the auxiliary steering angle detection value $\theta_{SR}$ detected by the auxiliary steering angle detection part 16, and outputs the auxiliary steering angle $\theta_S$ thus obtained. The auxiliary steering angle correction part 17 sets an initial value of the auxiliary steering angle correction amount $\Delta\theta_S$ (activation auxiliary steering angle correction amount $\Delta\theta_{S0}$) based on the activation auxiliary steering angle $\theta_{S0}$ and the auxiliary steering angle detection value $\theta_{SR}$, and gradually increases or gradually decreases the auxiliary steering angle correction amount $\Delta\theta_S$ to "0".

Hereinbelow, reference will be made to the operation of the vehicular steering system according to the first embodiment of the present invention while referring to FIGS. 2 through 8 together with FIG. 1. First of all, reference be made to the case where the steering wheel 1 is rotated with the worm gear 211 being fixed in the auxiliary steering angle superposition mechanism 2.

When the worm gear 211 is not caused to rotate, the ring gear 204 of the first planetary gear mechanism 21 is fixed. Under such a condition, when the driver operates the steering wheel 1, the torque of rotation thereof generated upon steering is transmitted to the sun gear 201 of the first planetary gear mechanism 21. The rotation of the sun gear 201 is transmitted to the planetary gears 202a, 202b, but at this time, the ring gear 204 is fixed, so the rotation of the sun gear 201 is converted into the orbital motion of the carrier 203 that supports the planetary gears 202a, 202b.

Accordingly, the first planetary gear mechanism 21, serving to rotate the shaft 210 for transmission of rotation to the second planetary gear mechanism 22, functions as a speed reducer. Subsequently, the rotation of the shaft 210 is transmitted to the carrier 208 of the second planetary gear mechanism 22. The planetary gears 207a, 207b are driven to revolve around the sun gear 206 in accordance with the rotation of the carrier 208.

Here, in the second planetary gear mechanism 22, the ring gear 209 is fixed, so the revolutions of the planetary gears 207a, 207b cause the sun gear 206 to rotate whereby the pinion gear 301 in the steering mechanism 3 is driven to rotate. At this time, the second planetary gear mechanism 22 operates as a speed increasing gear, as viewed from the shaft 210, and the rotation of the steering wheel 1 is mechanically transmitted to the pinion gear 301 in the steering mechanism 3.

Note that the transmission ratio at this time becomes a value which is obtained by multiplication of the speed reduction ratio (the reciprocal of the speed increasing ratio) of the first planetary gear mechanism 21 and the speed reduction ratio of the second planetary gear mechanism 22, and if the constructions of both the planetary gear mechanisms are the same with respect to each other, the transmission ratio as a whole becomes "1". That is, in the construction of the auxiliary steering angle superposition mechanism 2 as shown in FIG. 1, it is found that if the rotation of the worm gear 211 is stopped, the steering system becomes an ordinary steering system in which the steering wheel angle $\theta_H$ and the steered angle $\theta_P$ correspond one-to-one to each other.

Now, reference will be made to the case where the electric motor 212 is driven to rotate the worm gear 211 with the steering wheel 1 being fixed in the auxiliary steering angle superposition mechanism 2.

When the worm gear 211 is driven to rotate, the ring gear 204 is caused to rotate through the worm wheel 205. At this time, the rotation of the ring gear 204 is transmitted to the planetary gears 202a, 202b, but the sun gear 201 is fixed by the steering wheel 1, so the rotation of the ring gear 204 is transmitted to the shaft 210 through the carrier 203 as the revolutions of the planetary gears 202a, 202b. As the shaft 210 rotates, the steering mechanism 3 is driven to steer the steerable road wheels 5a, 5b through the second planetary gear mechanism 22, as stated above.

Next, reference will be made to the case where the electric motor 212 is driven to rotate the worm gear 211 while operating the steering wheel 1 in the auxiliary steering angle superposition mechanism 2. Here, the steerable road wheels 5a, 5b are steered by means of the steering wheel 1 and the auxiliary steering angle superposition mechanism 2. Thus, the mechanical property of the auxiliary steering angle superposition mechanism 2 is represented by the following expression (1) based on the steering wheel angle θh of the steering wheel 1, the rotation angle θm of the worm gear 211, the steered angle θp of the steerable road wheels 5a, 5b, and the speed ratio $G_S$ from the worm gear 211 to the pinion gear 301.

$$\theta p = \theta h + \theta m/G_s \qquad (1)$$

In addition, the auxiliary steering angle θs is a value that is obtained by dividing the rotation angle θm of the worm gear 211 by the speed ratio $G_S$ from the worm gear 211 to the pinion gear 301, so the expression (1) above is transformed into the following expression (2), as stated above. Here, note that the steering wheel angle θh, the rotation angle θm, the steered angle θp, and the auxiliary steering angle θs indicate individual angles in the interior of the entire mechanism from the steering wheel 1 to the steering mechanism 3 through the auxiliary steering angle superposition mechanism 2.

$$\theta p = \theta h + \theta s \quad (2)$$

Next, reference will be made to a variable gear ratio mechanism that changes the transmission characteristic $f(\theta_H)$ between the steering wheel angle $\theta_H$ and the steered angle $\theta_P$ of the steerable road wheels 5a, 5b in accordance with the traveling condition of the vehicle while referring to FIGS. 2 and 3.

Figure 2:
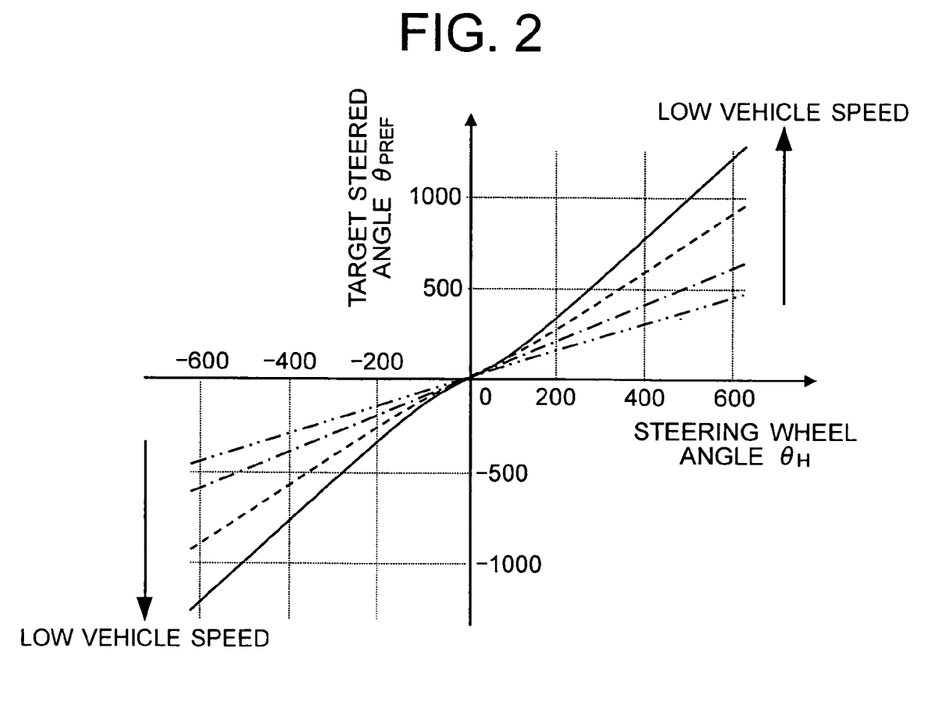
FIG. 2 is an explanatory view illustrating a transmission characteristic for calculating a target steered angle with respect to a steering wheel angle in case where a variable gear ratio mechanism is constructed by using the vehicular steering system of FIG. 1.
Figure 3:
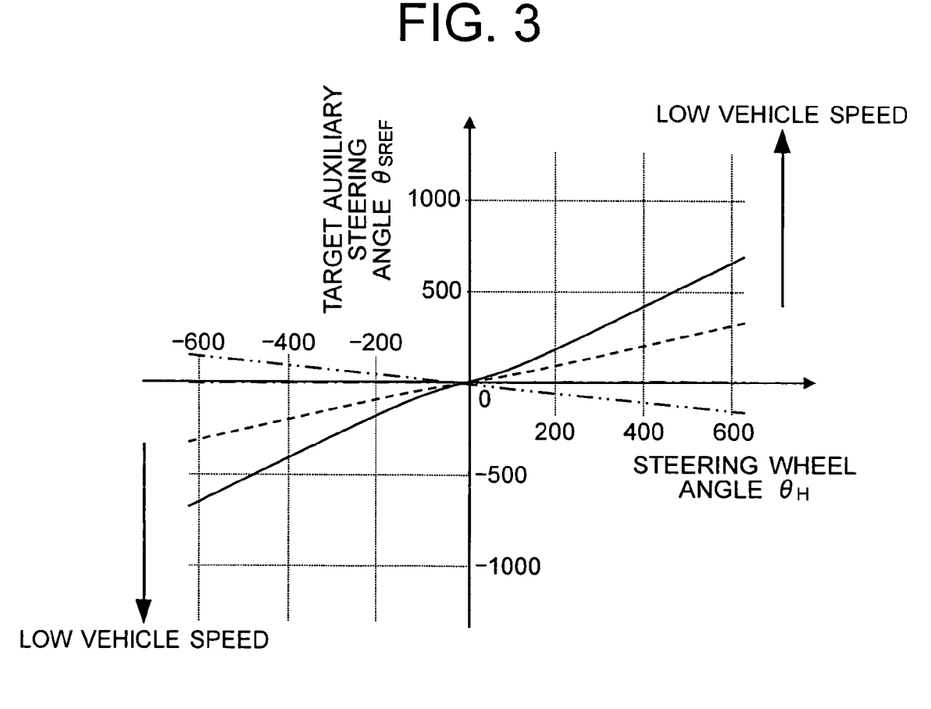
FIG. 3 is an explanatory view illustrating the relation between the steering wheel angle and a target auxiliary steering angle when the variable gear ratio mechanism is constructed by using the vehicular steering system of FIG. 1.

FIG. 2 is an explanatory view illustrating the transmission characteristic $f(\theta_H)$ for calculating a target steered angle $\theta_{PREF}$ for the steering wheel angle $\theta_H$ in case where a variable gear ratio mechanism is constructed by using the vehicular steering system of FIG. 1. FIG. 3 is an explanatory view illustrating the relation between the steering wheel angle $\theta_H$ and the target auxiliary steering angle $\theta_{SREF}$ when the variable gear ratio mechanism is constructed by using the vehicular steering system of FIG. 1.

In FIG. 2, the transmission characteristic $f(\theta_H)$ is set by the transmission characteristic setting section 8 in accordance with the traveling condition of the vehicle (the vehicle speed in this embodiment). In addition, in FIG. 3, the relation between the steering wheel angle $\theta_H$ and the target auxiliary steering angle $\theta_{SREF}$ is obtained from the relation between the steering wheel angle $\theta_H$ and the target steered angle $\theta_{PREF}$ shown in FIG. 2.

As described above, the steering wheel angle $\theta_H$ output from the steering wheel angle correction part 15 and the transmission characteristic $f(\theta_H)$ set by the transmission characteristic setting section 8 in accordance with the traveling condition of the vehicle are input to the target auxiliary steering angle calculation section 9. The target auxiliary steering angle calculation section 9 calculates the target steered angle $\theta_{PREF}$ based on the steering wheel angle $\theta_H$ and the transmission characteristic $f(\theta_H)$ according to the transmission characteristic shown in FIG. 2. The target steered angle $\theta_{PREF}$ is represented by the following expression (3).

$$\theta_{PREF} = f(\theta_H) \quad (3)$$

In addition, the target auxiliary steering angle calculation section 9 calculates the target auxiliary steering angle $\theta_{SREF}$ based on the steering wheel angle $\theta_H$ and the target steered angle $\theta_{PREF}$. Here, note that from the above expression (2), the relation of the following expression (4) holds among the steering wheel angle $\theta_H$, the target steered angle $\theta_{PREF}$ and the target auxiliary steering angle $\theta_{SREF}$.

$$\theta_{PREF} = \theta_H + \theta_{SREF} \quad (4)$$

That is, the target auxiliary steering angle $\theta_{SREF}$ calculated by the target auxiliary steering angle calculation section 9 is represented by the following expression (5) which is transformed from the above expression (4).

$$\theta_{SREF} = \theta_{PREF} - \theta_H \quad (5)$$

Subsequently, the driving control section 11 drives the electric motor 212 in the auxiliary steering angle superposition mechanism 2 in such a manner that the auxiliary steering angle $\theta_S$ detected by the auxiliary steering angle detection section 10 coincides with the target auxiliary steering angle $\theta_{SREF}$ calculated by the target auxiliary steering angle calculation section 9. The steering wheel angle $\theta_H$ and the target steered angle $\theta_{PREF}$ are controlled by controlling the driving of the auxiliary steering angle superposition mechanism 2 by means of the driving control section 11, as shown in FIG. 2.

Here, reference will be made to the case where the steering wheel 1 is steered with the vehicular steering system being stopped while referring to FIG. 4 and FIG. 5.

Figure 4:
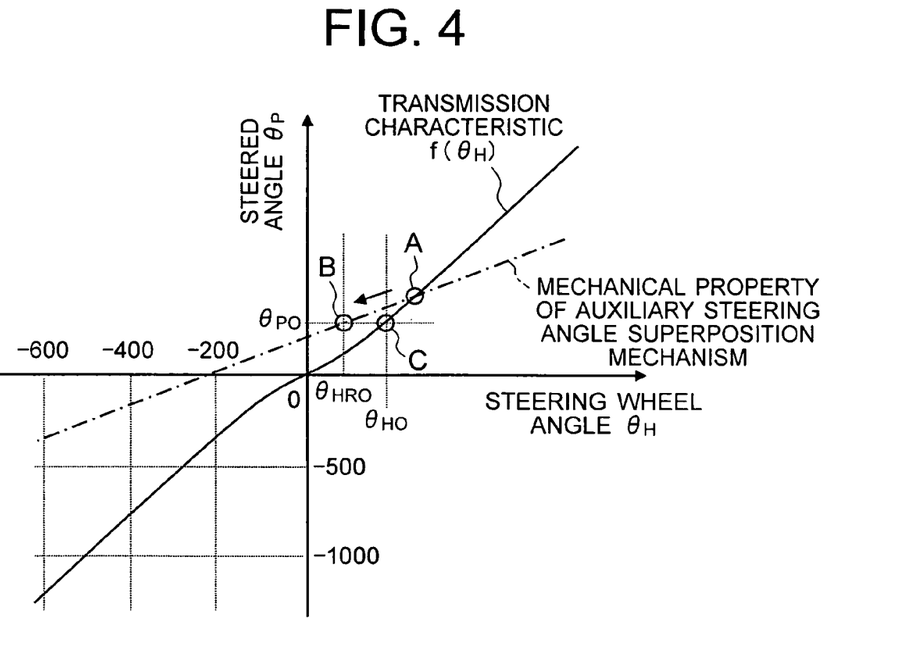
FIG. 4 is an explanatory view illustrating the relation between a transmission characteristic between the steering wheel angle and a steered angle in the vehicular steering system of FIG. 1 and the mechanical property of an auxiliary steering angle superposition mechanism.

FIG. 4 is an explanatory view illustrating the relation between the transmission characteristic $f(\theta_H)$ between the steering wheel angle $\theta_H$ and the steered angle $\theta_P$ in the vehicular steering system of FIG. 1 and the mechanical property of the auxiliary steering angle superposition mechanism 2. Also, FIG. 5 is an explanatory view illustrating the relation between the steering wheel angle $\theta_H$ and the auxiliary steering angle $\theta_S$ in the vehicular steering system of FIG. 1.

Figure 5:
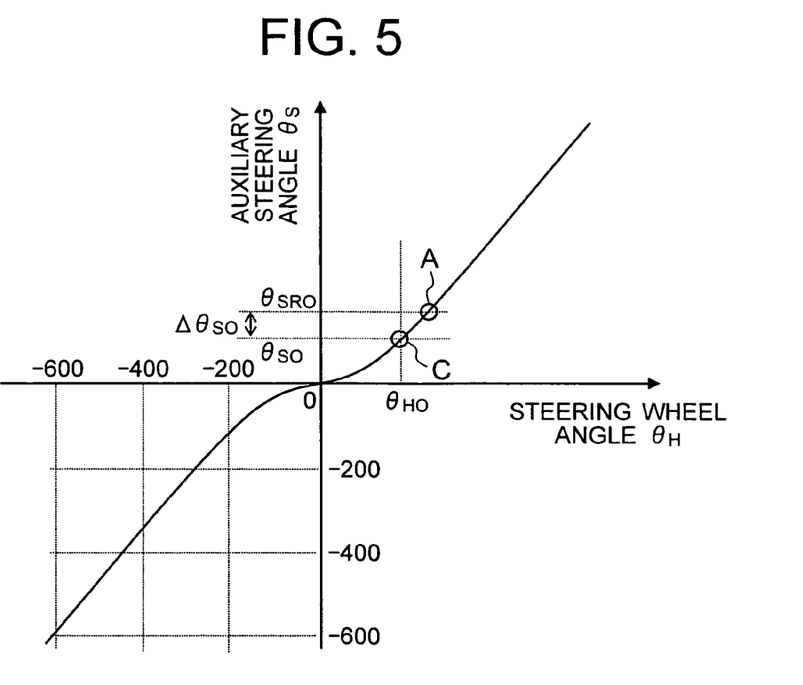
FIG. 5 is an explanatory view illustrating the relation between the steering wheel angle and an auxiliary steering angle in the vehicular steering system of FIG. 1.

Here, note that the auxiliary steering angle $\theta_S$ shown in FIG. 5 is a value that is obtained from the above expression (2) based on the steering wheel angle $\theta_H$ and the steered angle $\theta_P$ shown in FIG. 4.

In FIG. 4 and FIG. 5, a point A indicates a point at which the operation of the vehicular steering system is stopped. Also, this point A always exists on a line of the transmission characteristic $f(\theta_H)$ set by the transmission characteristic setting section 8. At this time, when the steering wheel 1 is steered, the vehicular steering system is in a stopped state, so the steering wheel angle $\theta_H$ and the steered angle $\theta_P$ change according to not the transmission characteristic $f(\theta_H)$ but the mechanical property of the auxiliary steering angle superposition mechanism 2. That is, as shown in FIG. 4, the steered angle $\theta_P$ deviates from the line of the transmission characteristic $f(\theta_H)$ to move to a point B on a line that represents the mechanical property of the auxiliary steering angle superposition mechanism 2. On the other hand, the vehicular steering system is in the stopped state, and hence the auxiliary steering angle $\theta_S$ does not change, so it does not move from the point A in FIG. 5.

Subsequently, when the vehicular steering system is activated, the steered angle detection section 12 detects the activation steered angle $\theta_{P0}$ at the point B in FIG. 4, as an absolute angle. When the activation steered angle $\theta_{P0}$ is detected, the activation angle setting section 13 estimates the activation steering wheel angle $\theta_{H0}$ based on the activation steered angle $\theta_{P0}$ and an inverse characteristic of the transmission characteristic $f(\theta_H)$. That is, representing the inverse characteristic of the transmission characteristic $f(\theta_H)$ by $f^{-1}(\theta_P)$, the activation steering wheel angle $\theta_{H0}$ is represented by the following expression (6).

$$\theta_{H0} = f^{-1}(\theta_{P0}) \quad (6)$$

This activation steering wheel angle $\theta_{H0}$ is a value that is calculated based on the transmission characteristic $f(\theta_H)$, as shown in FIG. 4, and is different from the actual value of the activation steering wheel angle $\theta_{H0}$ (actual activation steering wheel angle $\theta_{HR0}$). In addition, the activation angle setting section 13 estimates the activation auxiliary steering angle $\theta_{S0}$ from the above expression (2) based on the estimated activation steering wheel angle $\theta_{H0}$ and the transmission characteristic $f(\theta_H)$, as shown in FIG. 5. That is, the activation auxiliary steering angle $\theta_{S0}$ is represented by the following expression (7).

$$\theta_{S0} = f(\theta_{H0}) - \theta_{H0} \quad (7)$$

Accordingly, as shown in FIG. 4 and FIG. 5, the activation angle setting section 13 estimates the activation steering wheel angle $\theta_{H0}$ and the activation auxiliary steering angle $\theta_{S0}$ based on the activation steered angle $\theta_{P0}$ and the transmission characteristic $f(\theta_H)$, assuming that the steering wheel angle $\theta_H$ and the auxiliary steering angle $\theta_S$ exist at a point C on the line of the transmission characteristic $f(\theta_H)$.

Here, the initial value of the auxiliary steering angle detection value $\theta_{SR}$ (activation auxiliary steering angle detection value $\theta_{SR0}$) detected by the auxiliary steering angle detection part 16 is an absolute angle, and is different from the activation auxiliary steering angle $\theta_{S0}$. The auxiliary steering angle correction part 17 adds the auxiliary steering angle correction amount $\Delta\theta_S$ to the auxiliary steering angle detection value $\theta_{SR}$ so as to output the auxiliary steering angle $\theta_S$, as previously stated, and the activation auxiliary steering angle correction amount $\Delta\theta_{S0}$ to be added is represented by the following expression (8) based on the activation auxiliary steering angle $\theta_{S0}$ and the activation auxiliary steering angle detection value $\theta_{SR0}$.

$$\Delta\theta hd\ S0 = \theta_{S0} - \theta_{SR0} \quad (8)$$

Accordingly, the auxiliary steering angle $\theta_S$ output from the auxiliary steering angle correction part 17 is represented by the following expression (9).

$$\theta_S = \theta_{SR0} + \Delta\theta_{S0} = \theta_{S0} \quad (9)$$

That is, the auxiliary steering angle $\theta_S$ output from the auxiliary steering angle correction part 17 becomes equal to the activation auxiliary steering angle $\theta_{S0}$ estimated by the activation angle setting section 13.

On the other hand, the steering wheel angle detection part 14 detects a relative angle, but can not detect an absolute angle upon activation. Accordingly, the steering wheel angle detection part 14 according to this embodiment detects the steering angle of the steering wheel 1 with respect to the activation steering wheel angle $\theta_{H0}$ as the steering wheel angle detection value $\theta_{HS}$ in the form of a relative angle with the activation steering wheel angle $\theta_{H0}$ estimated by the activation angle setting section 13 being made a reference.

Figure 6:
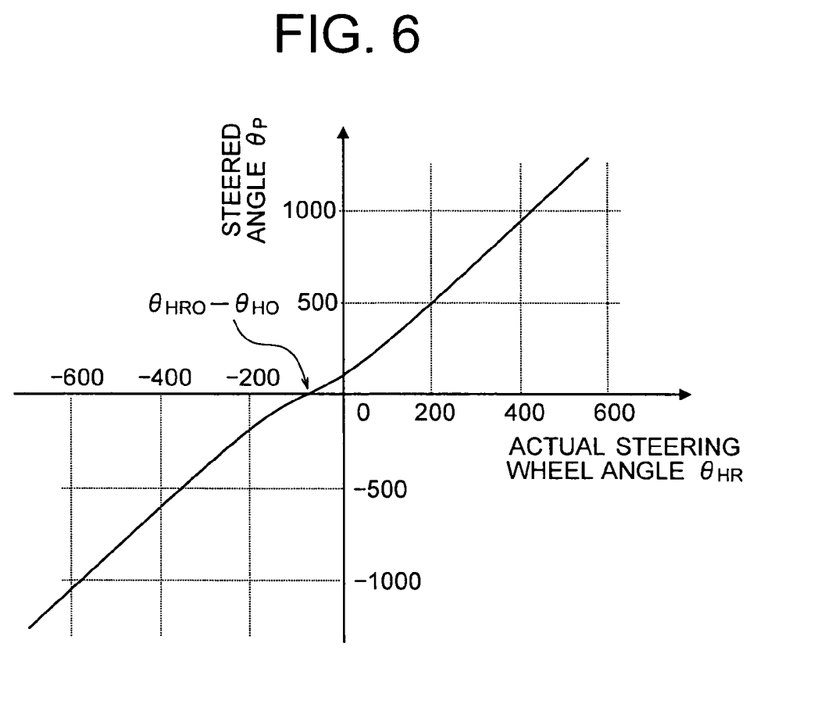
FIG. 6 is an explanatory view illustrating the relation between the steering wheel angle and the steered angle when a deviation occurs between an activation steering wheel angle and an actual activation steering wheel angle in the vehicular steering system of FIG. 1.

FIG. 6 is an explanatory view that illustrates the relation between the steering wheel angle $\theta_H$ and the steered angle $\theta_P$ when a deviation occurs between the activation steering wheel angle $\theta_{H0}$ and the actual activation steering wheel angle $\theta_{HR0}$ in the vehicular steering system of FIG. 1.

In FIG. 6, a zero point of the steering wheel angle detection value $\theta_{HS}$ is different from a zero point of the actual value of the steering wheel angle (actual steering wheel angle $\theta_{HR}$), and a difference therebetween is equal to a value of "$\theta_{HR0} - \theta_{H0}$". The steering wheel angle correction part 15 adds the steering wheel angle correction amount $\Delta\theta_H$ to the steering wheel angle detection value $\theta_{HS}$, and outputs a steering wheel angle $\theta_H$ thus obtained, as stated above. Note that the activation steering wheel angle correction amount $\Delta\theta_{H0}$ is "0", so the steering wheel angle $\theta_H$ output from the steering wheel angle correction part 15 becomes equal to the activation steering wheel angle $\theta_{H0}$ estimated by the activation angle setting section 13.

Here, reference will be made to the relation among the activation steering wheel angle $\theta_{H0}$ and the activation auxiliary steering angle $\theta_{S0}$ estimated by the activation angle setting section 13, the activation steered angle $\theta_{P0}$ detected by the steered angle detection section 12, the activation auxiliary steering angle detection value $\theta_{SR0}$ detected by the auxiliary steering angle detection part 16, and the actual activation steering wheel angle $\theta_{HR0}$. From the above expression (2), the relation of the following expression (10) holds among the activation steering wheel angle $\theta_{H0}$, the activation auxiliary steering angle $\theta_{S0}$, and the activation steered angle $\theta_{P0}$.

$$\theta_{H0} + \theta_{S0} = \theta_{P0} \quad (10)$$

On the other hand, from the above expression (2), the relation of the following expression (11) holds among the activation auxiliary steering angle detection value $\theta_{SR0}$, the actual activation steering wheel angle $\theta_{HR0}$, and the activation steered angle $\theta_{P0}$.

$$\theta_{HR0} + \theta_{SR0} = \theta_{P0} \quad (11)$$

Accordingly, the relation of the following expression (12) holds from the above expressions (10) and (11).

$$\theta_{HR0} - \theta_{H0} = \theta_{S0} - \theta_{SR} = \Delta\theta_{S0} \quad (12)$$

Therefore, the auxiliary steering angle $\theta_S$, which is output from the auxiliary steering angle correction part 17 after the vehicular steering system is activated to start the control operation of the auxiliary steering angle superposition mechanism 2, is represented by the following expression (13) by replacing the activation auxiliary steering angle detection value $\theta_{SR0}$ with the auxiliary steering angle detection value $\theta_{SR}$ in the above expression (9).

$$\theta_S = \theta_{SR} + \Delta\theta_{S0} \quad (13)$$

In addition, after the start of the control, the actual steering wheel angle $\theta_{HR}$ is represented by the following expression (14) by replacing the actual steering wheel angle upon starting $\theta_{HR0}$ with the actual steering wheel angle $\theta_{HR}$, and by replacing the activation steering wheel angle $\theta_{H0}$ with the steering wheel angle detection value $\theta_{HS}$ in the above expression (12).

$$\theta_{HR} = \theta_{HS} + \Delta\theta S0 \quad (14)$$

Accordingly, in order to coincide the steering wheel angle $\theta_H$ output from the steering wheel angle correction part 15 with the actual steering wheel angle $\theta_{HR}$, the steering wheel angle correction amount $\Delta\theta_H$ need only be set to the activation auxiliary steering angle correction amount $\Delta\theta_{S0}$.

Next, reference will be made to the operation of the vehicular steering system immediately after the vehicular steering system is activated to set the activation steering wheel angle $\theta_{H0}$ and the activation auxiliary steering angle $\theta_{S0}$.

The target auxiliary steering angle calculation section 9 calculates the target auxiliary steering angle $\theta_{SREF}$ to be superposed by the auxiliary steering angle superposition mechanism 2 based on the steering wheel angle $\theta_H$ output from the steering wheel angle correction section 15 and the transmission characteristic $f(\theta_H)$ set by the transmission characteristic setting section 8, as stated above.

Here, the steering wheel angle correction part 15 outputs the activation steering wheel angle $\theta_{H0}$, so the target auxiliary steering angle $\theta_{SREF}$ for the activation steering wheel angle $\theta_{H0}$ is represented by the following expression (15) based on the relation between the steering wheel angle $\theta_H$ and the auxiliary steering angle $\theta_S$ shown in FIG. 5.

$$\theta_{SREF} = \theta_{S0} \quad (15)$$

In addition, the auxiliary steering angle correction part 17 outputs the activation auxiliary steering angle $\theta_{S0}$, as previously stated, so the auxiliary steering angle $\theta_S$ and the target auxiliary steering angle $\theta_{SREF}$ coincide with each other, and the driving control section 11 does not drive the electric motor 212 in the auxiliary steering angle superposition mechanism 2. Accordingly, the steering wheel 1 never rotates on its own axis immediately after the activation of the vehicular steering system, and hence no uncomfortable feeling is given to the driver.

Further, under such a situation, when the steering wheel 1 is steered to its neutral position, i.e., when the steering wheel angle $\theta_H$ output from the steering wheel angle correction part 15 is made to be "0", the target auxiliary steering angle $\theta_{SREF}$ becomes "0" based on the relation between the steering wheel angle $\theta_H$ and the auxiliary steering angle $\theta_S$ shown in FIG. 5.

The driving control section 11 drives the electric motor 212 in the auxiliary steering angle superposition mechanism 2 in such a manner that the auxiliary steering angle $\theta_S$ output from the auxiliary steering angle correction part 17 becomes "0". At this time, in the above expression (14), the steering wheel angle detection value $\theta_{HS}$ becomes "0", and hence the following expression (16) is obtained.

$$\theta_{HR} = 0 + \Delta\theta_{S0} \quad (16)$$

Also, in the above expression (13), the auxiliary steering angle $\theta_S$ becomes "0", and the following expression (17) is obtained.

$$\theta_{SR} = 0 - \Delta\theta_{S0} \quad (17)$$

Accordingly, from the above expressions (2), (16) and (17), the relation of the following expression (18) holds among the steered angle $\theta_P$, the actual steering wheel angle $\theta_{HR}$, and the auxiliary steering angle detection value $\theta_{SR}$.

$$\theta_P = \theta_{HR} + \theta_{SR} = 0 \quad (18)$$

From the above expression (18), the steered angle $\theta_P$ at this time becomes "0", and the steerable road wheels 5a, 5b are controlled to their neutral positions. That is, the transmission characteristic $f(\theta_H)$ between the steering wheel angle $\theta_H$ output from the steering wheel angle correction part 15 and the steered angle $\theta_P$ of the steerable road wheels 5a, 5b becomes as shown in FIG. 2. On the other hand, between the actual steering wheel angle $\theta_{HR}$ and the steering wheel angle $\theta_H$ output from the steering wheel angle correction part 15, there occurs a deviation, as shown in the above expression (14), so control is executed on the actual steering wheel angle $\theta_{HR}$ with the neutral position thereof being deviated or shifted, as shown in FIG. 6. However, the neutral position of the steered angle $\theta_P$ is correctly controlled, as shown in the above expression (18), so a right and left difference does not occur in the vehicle behavior to the relative steering of the steering wheel 1.

Now, reference will be made to the operation of the vehicular steering system that serves to make the neutral position of the steering wheel 1 and the neutral positions of the steerable road wheels 5a, 5b coincide with each other.

In order to make the neutral positions of the steering wheel 1 and the steerable road wheels 5a, 5b coincide with each other, it is necessary to make the steering wheel angle $\theta_H$ output from the steering wheel angle correction part 15 and the actual steering wheel angle $\theta_{HR}$ coincide with each other, and at the same time to make the auxiliary steering angle $\theta_S$ output from the auxiliary steering angle correction part 17 and the auxiliary steering angle detection value $\theta_{SR}$ coincide with each other. That is, as shown in the above expression (14), it is only necessary to set the steering wheel angle correction amount $\Delta\theta_H$ added by the steering wheel angle correction part 15 to the activation auxiliary steering angle correction amount $\Delta\theta_{S0}$ and to set the auxiliary steering angle correction amount $\Delta\theta_S$ added by the auxiliary steering angle correction part 17 to "0".

However, when the steering wheel angle correction amount $\Delta\theta_H$ and the auxiliary steering angle correction amount $\Delta\theta_S$ are rapidly changed, the electric motor 212 in the auxiliary steering angle superposition mechanism 2 is rapidly driven to operate, as a consequence of which when the steering wheel 1 rotates on its own axis or when the driver holds the steering wheel 1, the steerable road wheels 5a, 5b may be rapidly steered, thus giving rise to an uncomfortable feeling to the driver. In order to suppress such an uncomfortable feeling, it is only necessary to change the steering wheel angle correction amount $\Delta\theta_H$ and the auxiliary steering angle correction amount $\Delta\theta_S$ in synchronization with each other.

Hereinafter, reference will be made to the operation of the vehicular steering system that changes the steering wheel angle correction amount $\Delta\theta_H$ and the auxiliary steering angle correction amount $\Delta\theta_S$ in synchronization with each other.

First of all, the steering wheel angle detection value $\theta_{HS}$ output from the steering wheel angle detection part 14 is represented as the following expression (19) by transformation of the above expression (14).

$$\theta_{HS} = \theta_{HR} - \Delta\theta_{S0} \quad (19)$$

Subsequently, the steering wheel angle $\theta_H$ output from the steering wheel angle correction part 15 is represented as the following expression (20) by adding the steering wheel angle correction amount $\Delta\theta_H$ to the steering wheel angle detection value $\theta_{HS}$ detected by the above expression (19).

$$\theta_H = \theta_{HS} + \Delta\theta_H = \theta_{HR} - \Delta\theta_{S0} + \Delta\theta_H \quad (20)$$

On the other hand, the auxiliary steering angle $\theta_S$ output from the auxiliary steering angle correction part 17 is represented as the following expression (21) by adding the auxiliary steering angle correction amount $\Delta\theta_S$ to the auxiliary steering angle detection value $\theta_{SR}$ detected by the auxiliary steering angle detection part 16.

$$\theta_S = \theta_{SR} + \Delta\theta_S \quad (21)$$

Here, in order to control the neutral positions of the steerable road wheels 5a, 5b in an accurate manner, it is necessary that the steered angle $\theta_P$ should be "0" when the steering wheel angle $\theta_H$ and the auxiliary steering angle $\theta_S$ are "0", respectively.

Accordingly, the following expression (22) is obtained by assigning "0" to the steering wheel angle $\theta_H$ in the above expression (20).

$$\theta_{HR} = \Delta\theta_{S0} - \Delta\theta_H \quad (22)$$

Also, by assigning "0" to the auxiliary steering angle $\theta_S$ in the above expression (21), the following expression (23) is obtained.

$$\theta_{SR} = -\Delta\theta_S \quad (23)$$

Further, the following expression (24) is obtained by assigning the above expressions (22) and (23) to the above expression (18).

$$(\Delta\theta_{S0} - \Delta\theta_H) + (-\Delta\theta_S) = \theta_P = 0$$

$$\therefore \Delta\theta_H = \Delta\theta_{S0} - \Delta\theta_S \quad (24)$$

Accordingly, by changing the steering wheel angle correction amount $\Delta\theta_H$ to be added by the steering wheel angle correction part 15 and the auxiliary steering angle correction amount $\Delta\theta_S$ to be added by the auxiliary steering angle correction part 17 while keeping the relation shown in the above expression (24), it is possible to correctly control the neutral positions of the steerable road wheels 5a, 5b without regard to the correction amounts. Therefore, no right and left difference is generated in the vehicle behavior to the relative steering of the steering wheel 1 even during the time when the correction amounts are being changed.

Here, note that when the steering wheel angle $\theta_H$ output from the steering wheel angle correction part 15 and the auxiliary steering angle $\theta_S$ output from the auxiliary steering angle correction part 17 are added by using the above expression (20) and the above expression (21), the following expression (25) is obtained.

$$\theta_H + \theta_S = (\theta_{HR} - \Delta\theta_{S0} + \Delta\theta_H) + (\theta_{SR} + \Delta\theta_S) \quad (25)$$

In addition, when the above expression (25) is organized by using the above expression (24), the following expression (26) is obtained.

$$\theta_H + \theta_S = \theta_{HR} + \theta_{SR} = \theta_P \quad (26)$$

From the above expression (26), it is found that the steering wheel angle $\theta_H$ output from the steering wheel angle correction part 15, the auxiliary steering angle $\theta_S$ output from the auxiliary steering angle correction part 17, and the steered angle $\theta_P$ satisfy the mechanical property of the auxiliary steering angle superposition mechanism 2 shown in the above expression (2).

Figure 7:
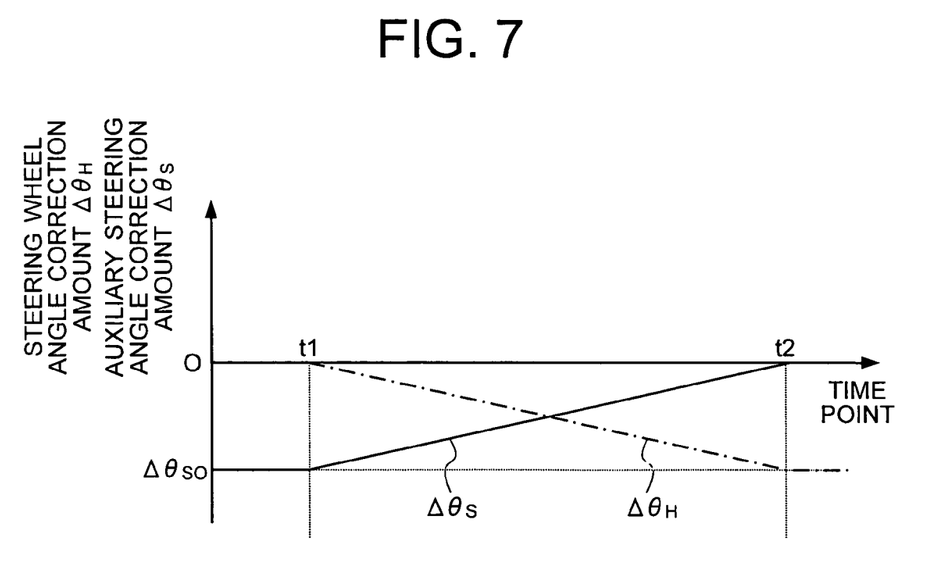
FIG. 7 is a timing chart showing the changes over time of a steering wheel angle correction amount and an auxiliary steering angle correction amount in the vehicular steering system of FIG. 1.

FIG. 7 is a timing chart that shows the changes over time of the steering wheel angle correction amount $\Delta\theta_H$ and the auxiliary steering angle correction amount $\Delta\theta_S$ in the vehicular steering system of FIG. 1.

In FIG. 7, the changes of the steering wheel angle correction amount $\Delta\theta_H$ and the auxiliary steering angle correction amount $\Delta\theta_S$ are started at time point t1. The auxiliary steering angle correction amount $\Delta\theta_S$ is gradually increased from the activation auxiliary steering angle correction amount $\Delta\theta_{S0}$ toward "0", whereas the steering wheel angle correction amount $\Delta\theta_H$ is changed while keeping the relation shown in the above expression (24). The changes of the steering wheel angle correction amount $\Delta\theta_H$ and the auxiliary steering angle correction amount $\Delta\theta_S$ are terminated at time point t2. Also, in FIG. 7, the ratio of the changes of the steering wheel angle correction amount $\Delta\theta_H$ and the auxiliary steering angle correction amount $\Delta\theta_S$ is set so as not to give an uncomfortable feeling to the driver.

At time point t2, the steering wheel angle correction amount $\Delta\theta_H$ becomes equal to the activation auxiliary steering angle correction amount $\Delta\theta_{S0}$ ($\Delta\theta_H = \Delta\theta_{S0}$), and the auxiliary steering angle correction amount $\Delta\theta_S$ becomes "0". At this time, by assigning "$\Delta\theta_H = \Delta\theta_{S0}$" to the above expression (20), the steering wheel angle $\theta_H$ output from the steering wheel angle correction part 15 is represented by the following expression (27).

$$\theta_H = \theta_{HR} \quad (27)$$

In addition, by assigning "$\Delta\theta_S = 0$" to the above expression (21), the auxiliary steering angle $\theta_S$ output from the auxiliary steering angle correction part 17 is represented by the following expression (28).

$$\theta_S = \theta_{SR} \quad (28)$$

That is, from the above expression (27), the steering wheel angle $\theta_H$ coincides with the actual steering wheel angle $\theta_{HR}$, and the auxiliary steering angle $\theta_S$ coincides with the auxiliary steering angle detection value $\theta_{SR}$. Thus, the neutral position of the steering wheel 1 and the neutral positions of the steerable road wheels 5a, 5b coincide with each other.

Figure 8:
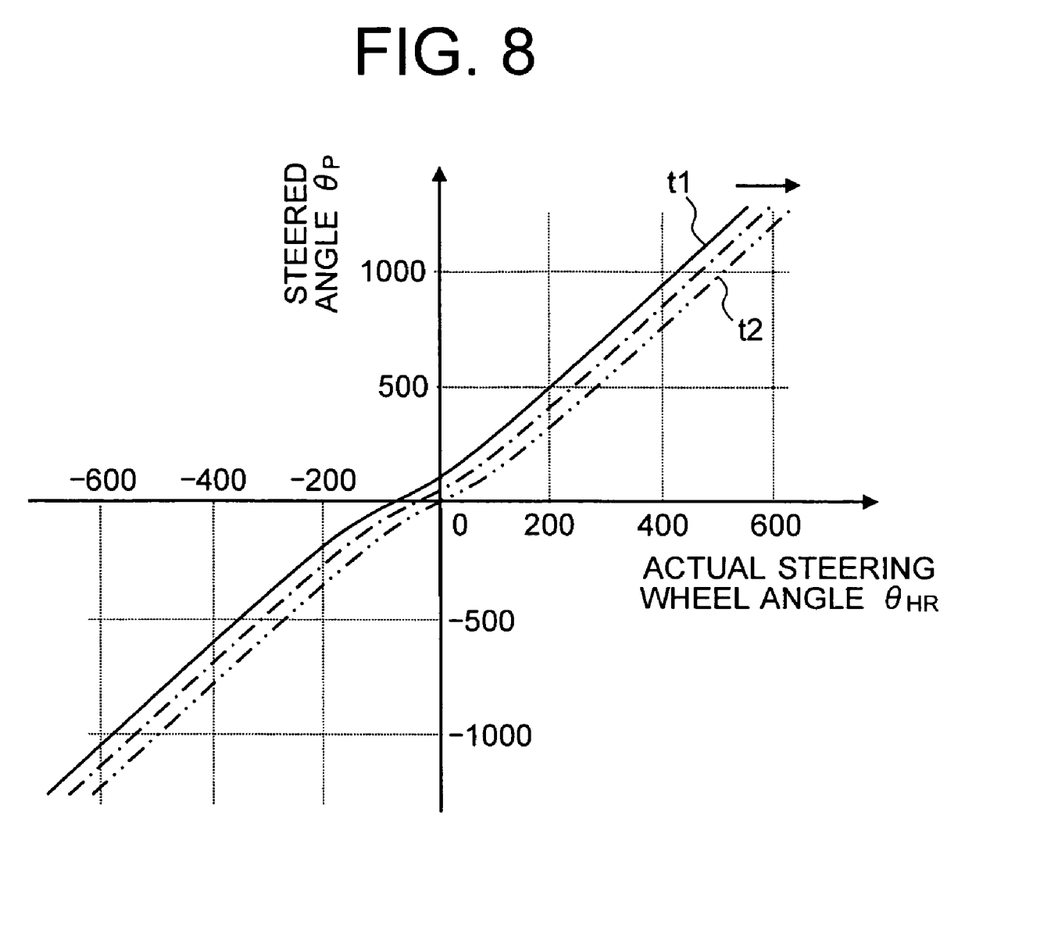
FIG. 8 is an explanatory view illustrating the change of the transmission characteristic between the actual steering wheel angle and the steered angle when the steering wheel angle correction amount and the auxiliary steering angle correction amount are caused to change in the vehicular steering system of FIG. 1.

FIG. 8 is an explanatory view that illustrates the change of the transmission characteristic $f(\theta_H)$ between the actual steering wheel angle $\theta_{HR}$ and the steered angle $\theta_P$ when the steering wheel angle correction amount $\Delta\theta_H$ and the auxiliary steering angle correction amount $\Delta\theta_S$ are caused to change in the vehicular steering system of FIG. 1.

In FIG. 8, at time point t1 at which the changes of the steering wheel angle correction amount $\Delta\theta_H$ and the auxiliary steering angle correction amount $\Delta\theta_S$ are started, the neutral position of the steering wheel 1 and the neutral positions of the steerable road wheels 5a, 5b are different from each other, but at time point t2 at which the changes of the steering wheel angle correction amount $\Delta\theta_H$ and the auxiliary steering angle correction amount $\Delta\theta_S$ are terminated, the neutral position of the steering wheel 1 and the neutral positions of the steerable road wheels 5a, 5b coincide with each other.

In addition, it is found from FIG. 8 that even during the steering wheel angle correction amount $\Delta\theta_H$ and the auxiliary steering angle correction amount $\Delta\theta_S$ are being changed, the neutral positions of the steerable road wheels 5a, 5b do not change, thus generating no right and left difference in the vehicle behavior to the relative steering of the steering wheel 1.

According to the vehicular steering system of the first embodiment of the present invention, at the start of control of the auxiliary steering angle superposition mechanism 2, the activation angle setting section 13 sets the initial value of the steering wheel angle $\theta_H$ as the activation steering wheel angle $\theta_{H0}$ based on the steered angle $\theta_P$ of the steerable road wheels 5a, 5b detected as an absolute angle and the transmission characteristic $f(\theta_H)$ set in accordance with the traveling condition of the vehicle, and also sets the initial value of the auxiliary steering angle $\theta_S$ as the activation auxiliary steering angle $\theta_{S0}$. Accordingly, even when the steering wheel 1 is steered to change the neutral position of the steering wheel 1 with the system being stopped, a right and left difference in the vehicle behavior can be suppressed by keeping the neutral positions of the steerable road wheels 5a, 5b from the start of control of the auxiliary steering angle superposition mechanism 2.

In addition, the auxiliary steering angle correction part 17 sets the activation auxiliary steering angle correction amount $\Delta\theta_{S0}$ based on the activation auxiliary steering angle $\Delta_{S0}$ and the auxiliary steering angle detection value $\theta_{SR}$, and gradually increases or gradually decreases the auxiliary steering angle correction amount $\Delta\theta_S$ to "0". The steering wheel angle correction part 15 sets the activation steering wheel angle correction amount $\Delta\theta_{H0}$ to "0" at the start of control of the auxiliary steering angle superposition mechanism 2, and sets, after the start of the control, the steering wheel angle correction amount $\Delta\theta_H$ so that the steering wheel angle $\theta_H$, the auxiliary steering angle $\theta_S$, and the steered angle $\theta_P$ can satisfy the mechanical property of the auxiliary steering angle superposition mechanism 2. Accordingly, the neutral position of the steering wheel 1 and the neutral positions of the steerable road wheels 5a, 5b can be made to coincide with each other without generating a right and left difference in the vehicle behavior to the relative steering of the steering wheel 1.

Embodiment 2

Figure 9:
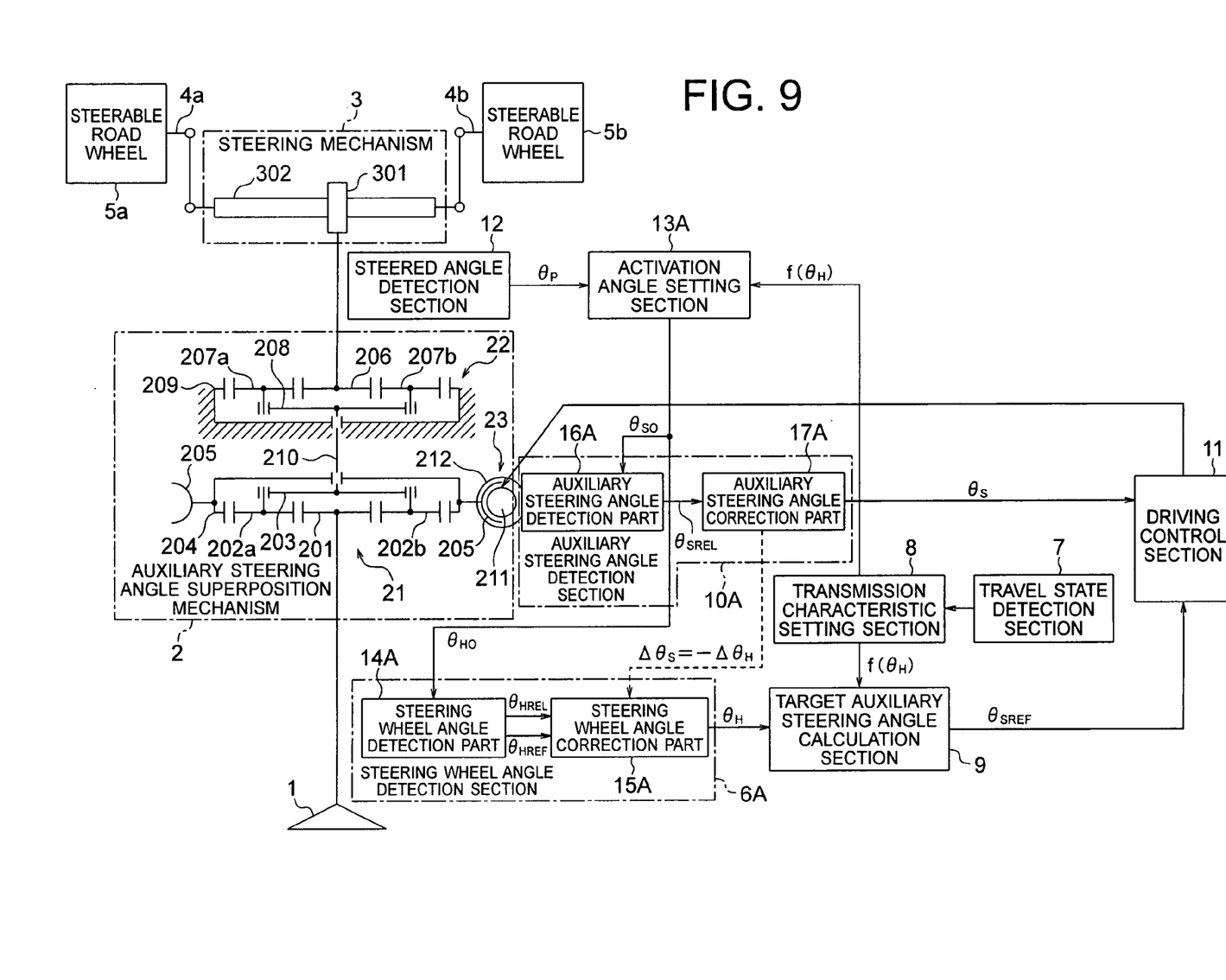
FIG. 9 is a block diagram showing a vehicular steering system according to a second embodiment of the present invention.

FIG. 9 is a block diagram that shows a vehicular steering system according to a second embodiment of the present invention.

In FIG. 9, the vehicular steering system is provided with a steering wheel angle detection section 6A, an auxiliary steering angle detection section 10A and an activation angle setting section 13A in place of the steering wheel angle detection section 6, the auxiliary steering angle detection section 10 and the activation angle setting section 13 shown in FIG. 1. The steering wheel angle detection section 6A includes a steering wheel angle detection part 14A and a steering wheel angle correction part 15A. Also, the auxiliary steering angle detection section 10A includes an auxiliary steering angle detection part 16A and an auxiliary steering angle correction part 17A.

The steering wheel angle detection section 6A detects the steering angle of the steering wheel 1 as a steering wheel angle $\theta_H$. The auxiliary steering angle detection section 10A detects an auxiliary steering angle $\theta_S$ to be superposed by the auxiliary steering angle superposition mechanism 2. The activation angle setting section 13A sets an activation steering wheel angle $\theta_{H0}$ and an activation auxiliary steering angle $\theta_{S0}$ based on an activation steered angle $\theta_{P0}$ and a transmission characteristic $f(\theta_H)$, similar to the above-mentioned first embodiment. Here, note that the activation steering wheel angle $\theta_{H0}$ set by the activation angle setting section 13A is input to the steering wheel angle detection part 14A, and the activation auxiliary steering angle $\theta_{S0}$ is input to the auxiliary steering angle detection part 16A.

The steering wheel angle detection part 14A detects the steering angle of the steering wheel 1 with respect to the activation steering wheel angle $\theta_{H0}$ as a steering wheel angle detection value $\theta_{HREL}$, and also detects, as a predetermined steering wheel angle $\theta_{HREF}$, that the steering wheel 1 becomes a predetermined steering angle which is arbitrarily set. Here, note that this predetermined steering angle is mechanically detected, for example, by a groove, a concave, a convex, or the like, formed in a rotation shaft of the steering wheel 1. The steering wheel angle correction part 15A adds the steering wheel angle correction amount $\Delta\theta_H$ to the steering wheel angle detection value $\theta_{HREL}$ detected by the steering wheel angle detection part 14A, and outputs a steering wheel angle $\theta_H$ thus obtained.

The steering wheel angle correction part 15A sets the initial value of the steering wheel angle correction amount $\Delta\theta_H$ (activation steering wheel angle correction amount $\Delta\theta_{H0}$) to "0" at the start of control of the auxiliary steering angle superposition mechanism 2, also sets, upon detection of the predetermined steering wheel angle $\theta_{HREF}$, a target correction angle for the steering wheel angle $\theta_H$ based on the predetermined steering wheel angle $\theta_{HREF}$ and the steering wheel angle detection value $\theta_{HREL}$, and gradually increases or gradually decreases the steering angle correction amount $\Delta\theta_H$ to the target correction angle.

The auxiliary steering angle detection part 16A detects a rotation angle $\theta_M$ of the worm gear 211 as a relative angle with respect to the activation auxiliary steering angle $\theta_{S0}$, and divides this rotation angle $\theta_M$ by a speed ratio $G_S$ from the worm gear 211 to the pinion gear 301 thereby to obtain an auxiliary steering angle detection value $\theta_{SREL}$. The auxiliary steering angle correction part 17A adds an auxiliary steering angle correction amount $\Delta\theta_S$ to the auxiliary steering angle detection value $\theta_{SREL}$ detected by the auxiliary steering angle detection part 16A, and outputs an auxiliary steering angle $\theta_S$ thus obtained.

The auxiliary steering angle correction part 17A sets the initial value of the auxiliary steering angle correction amount $\Delta\theta_S$ (activation auxiliary steering angle correction amount $\Delta\theta_{S0}$) to "0" at the start of control of the auxiliary steering angle superposition mechanism 2, and sets, after the start of the control, the auxiliary steering wheel angle correction amount $\Delta\theta_S$ so that the steering wheel angle $\theta_H$, the auxiliary steering angle $\theta_S$ and the steered angle $\theta_P$ can satisfy the mechanical property of the auxiliary steering angle superposition mechanism 2.

The construction of this second embodiment other than the above is similar to that of the first embodiment, and a description thereof is omitted.

Hereinbelow, reference will be made to the operation of the vehicular steering system according to the second embodiment of the present invention while referring to FIG. 10 together with FIGS. 2 through 9. Note that an explanation is omitted about an operation of this second embodiment similar to that of the first embodiment.

When the vehicular steering system is activated, the steered angle detection section 12 detects the activation steered angle $\theta_{P0}$ as an absolute angle. Upon detection of the activation steered angle $\theta_{P0}$, the activation angle setting section 13A estimates the activation steering wheel angle $\theta_{H0}$ and the activation auxiliary steered angle $\theta_{S0}$ based on the activation steered angle $\theta_{P0}$ and an inverse characteristic of the transmission characteristic $f(\theta_H)$.

The activation steering wheel angle $\theta_{H0}$ estimated by the activation angle setting section 13A is set as the initial value of the steering wheel angle detection part 14A, and the steering wheel angle detection part 14A detects the steering angle of the steering wheel 1 with respect to the activation steering wheel angle $\theta_{H0}$ as a steering wheel angle detection value $\theta_{HREL}$ in the form of a relative angle. Here, note that the activation steering wheel angle correction amount $\Delta\theta_{H0}$ is "0", so the initial value of the steering wheel angle $\theta_H$ output from the steering wheel angle correction part 15A becomes equal to the activation steering wheel angle $\theta_{H0}$ estimated by the activation angle setting section 13A.

In addition, the activation auxiliary steering angle $\theta_{S0}$ estimated by the activation angle setting section 13A is set as the initial value of the auxiliary steering angle detection part 16A. The auxiliary steering angle detection part 16A detects a relative angle to the activation auxiliary steering angle $\theta_{S0}$ as the auxiliary steering angle detection value $\theta_{SREL}$. Here, the activation auxiliary steering angle correction amount $\Delta\theta_{S0\,1\,is}$ "0", so the initial value of the auxiliary steering angle $\theta_S$ output from the auxiliary steering angle correction part 17A becomes equal to the activation auxiliary steering angle $\theta_{S0}$ estimated by the activation angle setting section 13A.

Next, reference will be made to the operation of the vehicular steering system immediately after the vehicular steering system is activated to set the activation steering wheel angle $\theta_{H0}$ and the activation auxiliary steering angle $\theta_{S0}$.

The target auxiliary steering angle calculation section 9 calculates the target auxiliary steering angle $\theta_{SREF}$ to be superposed by the auxiliary steering angle superposition mechanism 2 based on the steering wheel angle $\theta_H$ output from the steering wheel angle correction section 15A and the transmission characteristic $f(\theta_H)$ set by the transmission characteristic setting section 8, as stated before.

Here, the steering wheel angle correction part 15A outputs the activation steering wheel angle $\theta H_0$, so the target auxiliary steering angle $\theta_{SREF}$ for the activation steering wheel angle $\theta_{H0}$ becomes the activation auxiliary steering angle $\theta_{S0}$ based on the relation between the steering wheel angle $\theta_H$ and the auxiliary steering angle $\theta_S$ shown in FIG. 5. Accordingly, the auxiliary steering angle $\theta_S$ and the target auxiliary steering angle $\theta_{SREF}$ coincide with each other, so the driving control section 11 does not drive the electric motor 212 in the auxiliary steering angle superposition mechanism 2. Thus, the steering wheel 1 never rotates on its own axis immediately after the activation of the vehicular steering system, and hence no uncomfortable feeling is given to the driver.

In addition, from the above expression (2), the relation of the following expression (29) holds among the steering wheel angle detection value $\theta_{HREL}$ detected by the steering wheel angle detection part 14A, the auxiliary steering angle detection value $\theta_{SREL}$ detected by the auxiliary steering angle detection part 16A, and the steered angle $\theta_P$ detected by the steered angle detection section 12.

$$\theta_P = \theta_{HREL} + \theta_{SREL} \tag{29}$$

Subsequently, when the driver steers the steering wheel 1 to a predetermined steering angle that is arbitrarily set, the steering wheel angle detection part 14A detects the predetermined steering wheel angle $\theta_{HREF}$.

As such a predetermined angle, a single angle may be set, or a plurality of angles may instead be set. At this time, as amount of deviation $\Delta\theta_{HTAG}$ of the neutral position of the steering wheel 1 (target correction angle) is represented by the following expression (30) based on the steering wheel angle detection value $\theta_{HREL}$ detected by the steering wheel angle detection part 14A and the predetermined steering wheel angle $\theta_{HREF}$.

$$\Delta\theta_{HTAG} = \theta_{HREF} - \theta_{HREL} \quad (30)$$

That is, the actual steering wheel angle $\theta_{HR}$ is represented by the following expression (31).

$$\theta_{HR} = \theta_{HREL} + \Delta\theta_{HTAG} \quad (31)$$

Accordingly, in order to make the neutral positions of the steering wheel 1 and the steerable road wheels 5a, 5b coincide with each other, it is necessary to change the steering wheel angle correction amount $\Delta\theta_H$ from "0" up to the amount of deviation $\Delta\theta_{HTAG}$ of the neutral position of the steering wheel 1. Here, note that from the above expressions (20) and (21), the steering wheel angle $\theta_H$ output from the steering wheel angle correction part 15A and the auxiliary steering angle $\theta_S$ output from the auxiliary steering angle correction part 17A are represented by the following expressions (32) and (33), respectively.

$$\theta_H = \theta_{HREL} + \Delta\theta_H \quad (32)$$

$$\theta_S = \theta_{SREL} + \Delta\theta_S \quad (33)$$

Also, it is necessary for the steering wheel angle $\theta_H$ output from the steering wheel angle correction part 15A, the auxiliary steering angle $\theta_S$ output from the auxiliary steering angle correction part 17A, and the steered angle $\theta_P$ to satisfy the relation of the above-mentioned expression (2), so the following expression (34) holds from the above-mentioned expressions (2), (29), (32) and (33).

$$\Delta\theta_S = -\Delta\theta_H \quad (34)$$

Accordingly, by changing the steering wheel angle correction amount $\Delta\theta_H$ to be added by the steering wheel angle correction part 15A from "0" up to the amount of deviation $\Delta\theta_{HTAG}$ of the neutral position, and at the same time by changing the auxiliary steering angle correction amount $\Delta\theta_S$ while keeping the relation shown in the above expression (34), it is possible to make the neutral position of the steering wheel 1 and the neutral positions of the steerable road wheels 5a, 5b coincide with each other, as in the above-mentioned first embodiment.

Figure 10:
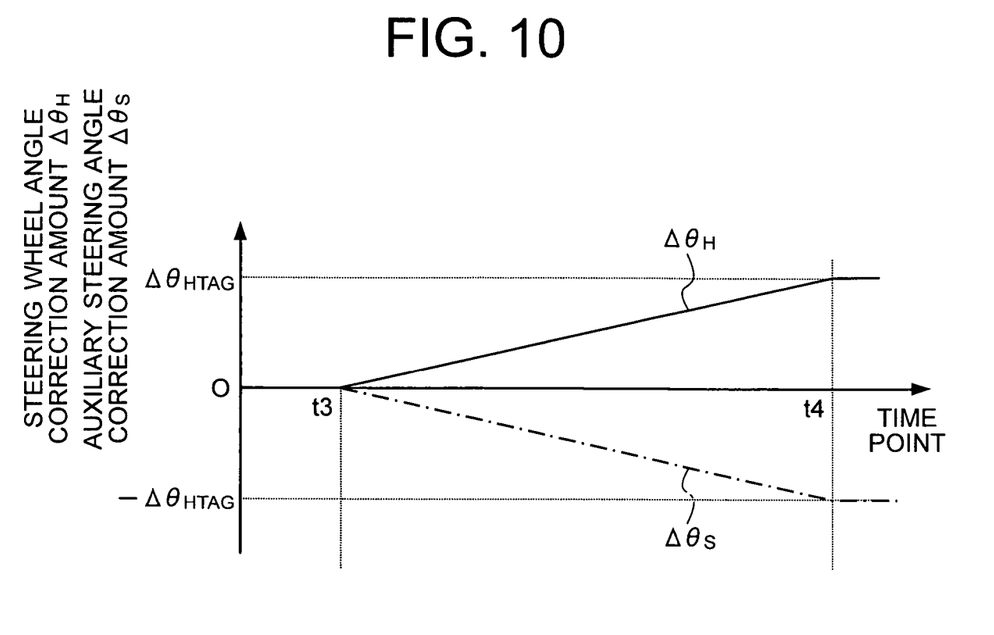
FIG. 10 is a timing chart showing the changes over time of a steering wheel angle correction amount and an auxiliary steering angle correction amount in the vehicular steering system of FIG. 9.

FIG. 10 is a timing chart that shows the changes over time of the steering wheel angle correction amount $\Delta\theta_H$ and the auxiliary steering angle correction amount $\Delta\theta_S$ in the vehicular steering system of FIG. 9.

In FIG. 10, at time point t3, the changes of the steering wheel angle correction amount $\Delta\theta_H$ and the auxiliary steering angle correction amount $\Delta\theta_S$ are started. The steering wheel angle correction amount $\Delta\theta_H$ is gradually increased from "0" up to the amount of deviation $\Delta\theta_{HTAG}$ of the neutral position, whereas the auxiliary steering angle correction amount $\Delta\theta_S$ is changed while keeping the relation shown in the above expression (34). The changes of the steering wheel angle correction amount $\Delta\theta_H$ and the auxiliary steering angle correction amount $\Delta\theta_S$ are terminated at time point t4. Also, in FIG. 10, the ratio of the changes of the steering wheel angle correction amount $\Delta\theta_H$ and the auxiliary steering angle correction amount $\Delta\theta_S$ is set so as not to give an uncomfortable feeling to the driver.

According to the vehicular steering system of the second embodiment of the present invention, the steering wheel angle correction part 15A sets the activation steering wheel angle correction amount $\Delta\theta_{H0}$ to "0" at the start of control of the auxiliary steering angle superposition mechanism 2, also sets, upon detection of the predetermined steering wheel angle $\theta_{HREF}$, the target correction angle for the steering wheel angle $\theta_H$ based on the predetermined steering wheel angle $\theta_H$ and the steering wheel angle detection value $\theta_{HREL}$, and gradually increases or gradually decreases the steering angle correction amount $\Delta\theta_H$ to the target correction angle. The auxiliary steering angle correction part 17A sets the activation auxiliary steering angle correction amount $\Delta\theta_{S0}$ to "0" at the start of control of the auxiliary steering angle superposition mechanism 2, and sets, after the start of the control, the auxiliary steering wheel angle correction amount $\Delta\theta_S$ so that the steering wheel angle $\theta_H$, the auxiliary steering angle $\theta_S$ and the steered angle $\theta_P$ can satisfy the mechanical property of the auxiliary steering angle superposition mechanism 2. Accordingly, the neutral position of the steering wheel 1 and the neutral positions of the steerable road wheels 5a, 5b can be made to coincide with each other without generating a right and left difference in the vehicle behavior to the relative steering of the steering wheel 1, as in the case of the above-mentioned first embodiment.

In the above-mentioned first and second embodiments, the steering wheel angle correction amount $\Delta\theta_H$ and the auxiliary steering angle correction amount $\Delta\theta_S$ are uniformly changed, as shown in FIG. 7 and FIG. 10, respectively, but the present invention is not limited to this. The ratio of the changes of the steering wheel angle correction amount $\Delta\theta_H$ and the auxiliary steering angle correction amount $\Delta\theta_S$ may be changed depending on the direction of steering, the speed of steering, etc., of the steering wheel 1. In this case, too, the operational effects similar to those of the above-mentioned first and second embodiments can be achieved.

In addition, by providing information by a lamp or voice, or by giving vibration to the steering wheel 1, etc., at the time when the steering wheel angle correction amount $\Delta\theta_H$ and the auxiliary steering angle correction amount $\Delta\theta_S$ are being changed, the driver may be informed of the changes of the steering wheel angle correction amount $\Delta\theta_H$ and the auxiliary steering angle correction amount $\Delta\theta_S$. In this case, it is possible to suppress the occurrence of an uncomfortable feeling to the driver.

While the invention has been described in terms of preferred embodiments, those skilled in the art will recognize that the invention can be practiced with modifications within the spirit and scope of the appended claims.

What is claimed is:

1. A vehicular steering system having a steering mechanism which includes a steering wheel installed on a vehicle and an electrically controlled auxiliary steering angle superposition mechanism for steering steerable road wheels of the vehicle, the system comprising:

a steering wheel angle detection section that detects a steering angle of the steering wheel as a steering wheel angle;

an auxiliary steering angle detection section that detects an auxiliary steering angle to be superposed by the auxiliary steering angle superposition mechanism;

a steered angle detection section that detects a steered angle of the steerable road wheels as an absolute angle;

a travel state detection section that detects the traveling state of the vehicle;

a transmission characteristic setting section that sets a transmission characteristic between the steering wheel angle and the steered angle in accordance with the traveling state of the vehicle;

a target auxiliary steering angle calculation section that calculates a target auxiliary steering angle to be superposed by the auxiliary steering angle superposition mechanism based on the steering wheel angle and the transmission characteristic;

a driving control section that controls driving of the auxiliary steering angle superposition mechanism so as to make the auxiliary steering angle coincide with the target auxiliary steering angle; and an activation angle setting section that sets an initial value of the steering wheel angle detected by the steering wheel angle detection section as an activation steering wheel angle based on the steered angle and the transmission characteristic at the start of control of the auxiliary steering angle superposition mechanism, and also sets an initial value of the auxiliary steering angle detected by the auxiliary steering angle detection section as an activation auxiliary steering angle.

2. The vehicular steering system as set forth in claim 1, wherein the steering wheel angle detection section includes a steering wheel angle detection part that detects the steering angle of the steering wheel as a steering wheel angle detection value and a steering wheel angle correction part that adds a steering wheel angle correction amount to the steering wheel angle detection value thereby to output the steering wheel angle;

the auxiliary steering angle detection section includes an auxiliary steering angle detection part that detects an angle to be superposed by the auxiliary steering angle superposition mechanism as an auxiliary steering angle detection value in the form of an absolute angle, and an auxiliary steering angle correction part that adds an auxiliary steering angle correction amount to the auxiliary steering angle detection value thereby to output the auxiliary steering angle;

the auxiliary steering angle correction part sets an initial value of the auxiliary steering angle correction amount based on the activation auxiliary steering angle and the auxiliary steering angle detection value, and gradually increases or gradually decreases the auxiliary steering angle correction amount to zero; and the steering wheel angle correction part sets the initial value of the steering wheel angle correction amount to zero at the start of control of the auxiliary steering angle superposition mechanism, and also sets, after the start of the control, the steering wheel angle correction amount so that the steering wheel angle, the auxiliary steering angle, and the steered angle satisfy a mechanical property of the auxiliary steering angle superposition mechanism.

3. The vehicular steering system as set forth in claim 1, wherein the steering wheel angle detection section includes a steering wheel angle detection part that detects the steering angle of the steering wheel as a steering wheel angle detection value and also detects, as a predetermined steering wheel angle, that the steering angle of the steering wheel has become a predetermined angle, and a steering wheel angle correction part that adds a steering wheel angle correction amount to the steering wheel angle detection value thereby to output the steering wheel angle;

the auxiliary steering angle detection section includes an auxiliary steering angle detection part that detects an angle to be superposed by the auxiliary steering angle superposition mechanism as an auxiliary steering angle detection value, and an auxiliary steering angle correction part that adds an auxiliary steering angle correction amount to the auxiliary steering angle detection value thereby to output the auxiliary steering angle;

the steering wheel angle correction part sets the initial value of the steering wheel angle correction amount to zero at the start of control of the auxiliary steering angle superposition mechanism, also sets, upon detection of the predetermined steering wheel angle, a target correction angle for the steering wheel angle based on the predetermined steering wheel angle and the steering wheel angle detection value, and gradually increases or gradually decreases the steering angle correction amount to the target correction angle; and the auxiliary steering angle correction part sets the initial value of the auxiliary steering angle correction amount to zero at the start of control of the auxiliary steering angle superposition mechanism, and also sets, after the start of the control, the auxiliary steering angle correction amount so that the steering wheel angle, the auxiliary steering angle, and the steered angle satisfy a mechanical property of the auxiliary steering angle superposition mechanism.

4. The vehicular steering system as set forth in claim 1, wherein the transmission characteristic includes a nonlinear characteristic.

* * * * *